Oct. 3, 1933.   L. L. NAKASHIAN   1,929,118
AUTOMATIC POWER COUPLING AND CUT-OFF
Original Filed May 25, 1929   2 Sheets-Sheet 2

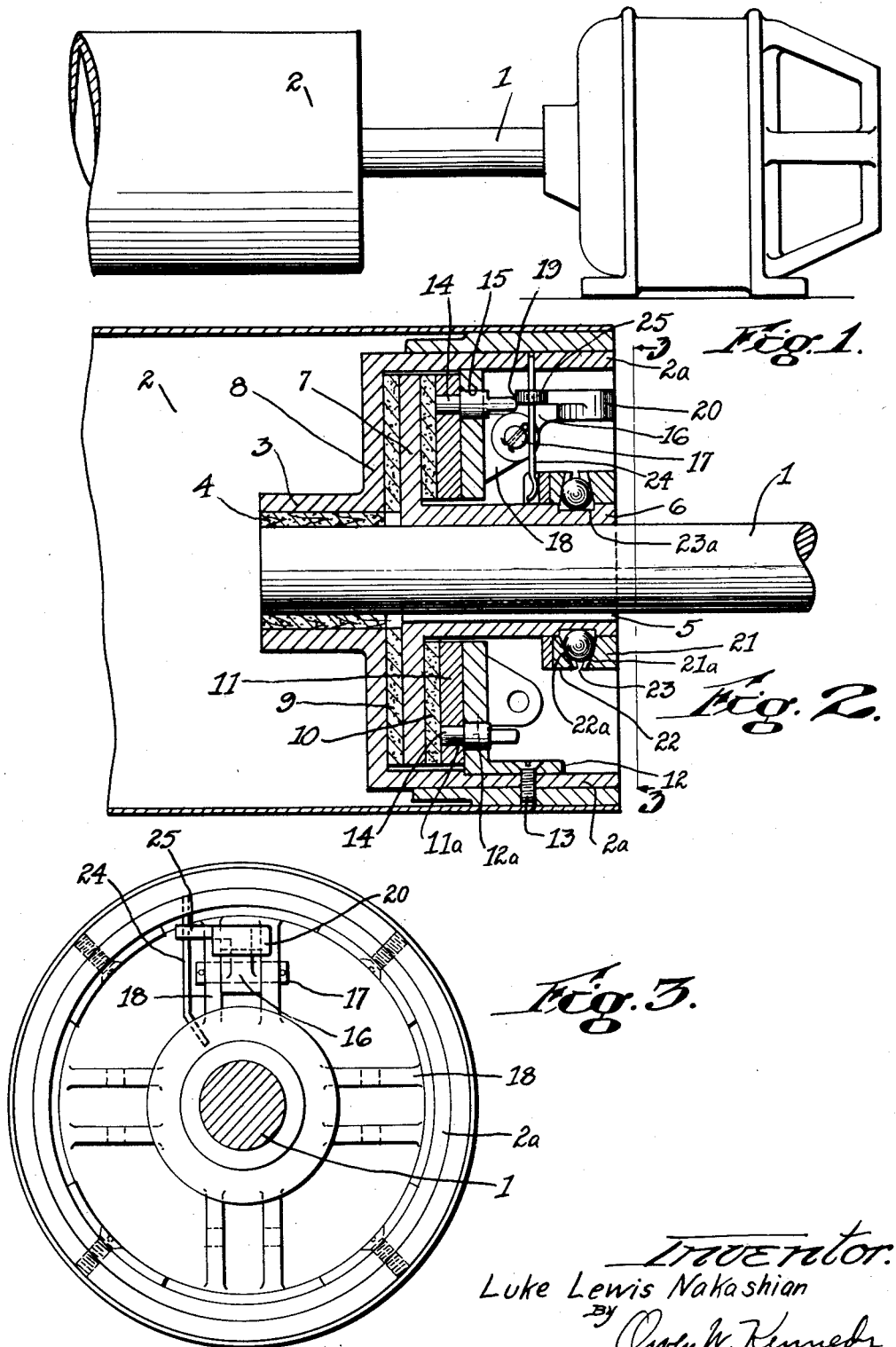

Inventor:
Luke L. Nakashian
By Owen W. Kennedy
Attorney

Patented Oct. 3, 1933

1,929,118

UNITED STATES PATENT OFFICE 1,929,118

AUTOMATIC POWER COUPLING AND CUT-OFF

Luke Lewis Nakashian, Worcester, Mass.

Application May 25, 1929, Serial No. 366,017
Renewed September 9, 1932

5 Claims. (Cl. 192—105)

The present invention relates to an improved power transmitting coupling that is adapted to automatically connect rotatable driving and driven elements for the transmission of power therebetween after the driving element has reached its normal operating speed and to disconnect said elements when the driving element is not rotating.

In my copending application, Serial No. 360,630 filed May 6, 1929, there is shown and described a clutch that is adapted to connect the driven element to the driving element when the driven element has attained the speed of the driver. In this clutch, friction members are always maintained in a limited degree of frictional engagement when the driver is stationary, so as to cause the driven element to start to rotate with the driver as soon as the driver starts to rotate, although at a greatly reduced speed. As a consequence, the elements are never disconnected and the driver is not free to accelerate to full speed, and one object of the present invention is to provide an improved arrangement for setting up the friction necessary to set the driven member in rotation, only after the driver has accelerated practically to full speed and its prime mover is developing full power. This automatic action renders the operation of the mechanism entirely independent of springs and insures a positive and uniform functioning of the device for the efficient transmission of power. The above and other advantageous features of my invention will hereinafter more fully appear, with reference to the accompanying drawings, in which—

Fig. 1 is a view in side elevation of a coupling embodying my invention.

Fig. 2 is a view in vertical section of the parts shown in Fig. 1, on an enlarged scale.

Fig. 3 is a vertical sectional view along the line 3—3 of Fig. 2, looking in the direction of the arrows.

Like reference characters refer to like parts in the different figures.

Figure 4:
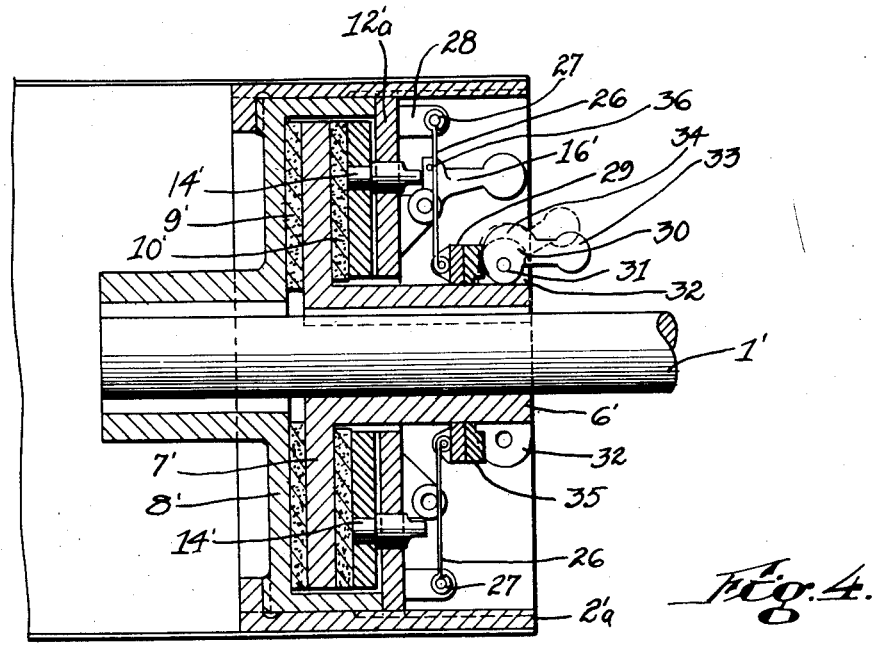
Fig. 4 is a fragmentary view similar to Fig. 2 illustrating a modification of the device.
Figure 5:
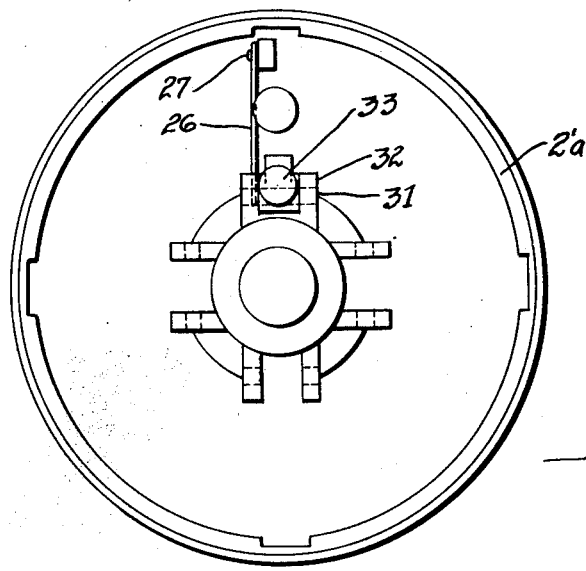
Fig. 5 is an end view of the parts shown in Fig. 4.

Referring to the drawings, the driving element 1 is represented by a portion of a shaft to which power is applied in any suitable manner from a prime mover such as an electric motor, the shaft 1 being connected to the prime mover either directly or by gearing. The driven element is generally designated by the reference character 2 and in the present illustrative embodiment of the invention is shown as comprising a cylindrical drum 2a to which is connected a load requiring a high starting torque. The drum 2a provides a hub portion 3 rotatable with a bushing 4 surrounding the shaft 1. The driving shaft 1 has connected thereto by means of a key 5, a sleeve 6 which is capable of axial movement on the shaft 1 but rotates therewith, the sleeve 6 providing a circular flange 7, the outer periphery of which is received freely within the drum 2a. The flange 7 is parallel to and spaced from a flange 8 connecting the hub 3 of the driven element 2 to its surrounding drum 2a which being connected to the load is not movable axially on the shaft 1. An annular disk 9 of suitable frictional material is interposed between the flanges 7 and 8 respectively and a second annular disk 10 also of frictional material is interposed between the flange 7 of the driving shaft 1 and a pressure plate 11. The plate 11 abuts a flange 12a forming part of a sleeve 12 secured to the drum 2a in any suitable manner as by bolts 13.

The frictional disks 9 and 10 are adapted to be pressed in frictional engagement with the flanges 7 and 8 carried by the shaft 1 and drum 2a respectively, by means of a number of plungers 14 slidably received in openings 15 provided in the flange 12a, two or more of such plungers 15 being preferably equally spaced around the periphery of the flange 11, as indicated in Fig. 3. The reduced ends of the plungers are seated in openings 11a of the pressure plate 11 and when the driven element 2 is rotated, the plungers 14 are adapted to be pressed inwardly into engagement with the plate 11 by means of a number of levers 16, each pivotally mounted on a pin 17 received between a pair of lugs 18 provided by the flange 12a of sleeve 12. Each lever 16 provides a shoulder 19 adapted to bear on the end of a plunger 14 when the lever 16 is turned about its axis in a counterclockwise direction in response to centrifugal force developed by rotation of the driven element 2. Each lever 16 provides a weighted portion 20, so that the center of gravity of the lever 16 is located farther away from the axis of the pivot pin 17 than is the point where the plunger 14 engages the shoulder 19.

The above described mounting of the levers 16 with relation to the plungers 14 is substantially the same as described in my aforesaid copending application Serial No. 360,630, but it is obvious that with the driving shaft 1 at rest, there is no pressure exerted on disks 9 and 10 and the elements 1 and 2 are entirely disconnected. My present invention provides means for causing the plungers 14 to exert a pressure on the friction plates 9 and 10 as soon as the driving shaft 1 has reached a predetermined speed and to this end the shaft 1 carries a ring 21 fast on sleeve 6 and a second ring 22 movable axially on the sleeve 6 with a series of balls 23 interposed between said rings 21 and 22 and seated in a groove 23a with the shaft 1 at rest. The rings 21 and 22 provide opposed beveled faces 21a and 22a and these faces are maintained in engagement with the balls 23 by means of a number of fingers 24 anchored to the drum 2a and extending inwardly to bear on the axially movable ring 22.

The fingers 24 are so formed as to exert a slight pressure tending to hold the beveled ring faces 21a and 22a in engagement with the balls 23, but as soon as the driving shaft 1 starts to rotate, the centrifugal force acting on the balls 23 tends to move the balls 23 away from the shaft 1 out of the groove 23a in which the balls 23 are normally received. When this movement of the balls 23 takes place, the movable ring 22 is shifted axially on the sleeve 6 so as to bear on the fingers 24 and tend to flex them towards the pressure plate 11. As a finger 24 is so flexed, it presses on a lug 25 projecting from a lever 16 adjacent to the shoulder 19, see Fig. 2, thereby causing the lever 16 acting through its plunger 14 to exert a pressure on the friction disks 9 and 10 and the interposed flanges 7 and 8.

In view of the above construction, it is obvious that when the driving shaft 1 starts to rotate and reaches a certain speed, the outward movement of the balls 23 will cause the plungers 14 to exert a pressure on the friction plates 9 and 10 thereby causing the driven element 2 to be slightly rotated with the shaft 1. As the shaft 1 rapidly comes up to speed, the pressure exerted by the fingers 24 on the plungers 14 increases so that the drum 2a is soon rotated fast enough to cause centrifugal force to turn the levers 16 in a counterclockwise direction about their pivots, thus adding to the pressure exerted on the plungers 14 until the driven element 2 is rotating at the same speed as the driving shaft 1 and the full power of the shaft 1 is being transmitted. When the shaft 1 comes to rest, the levers 16 and the balls 23 move inwardly towards the axis of the shaft 1, thereby completely disconnecting the driven element 2 from the driving shaft 1.

In the operation as described above, it is obvious that no pressure is exerted on the friction disks 9 and 10 until after shaft 1 starts to rotate, thereby making it possible for the motor, or other prime mover to accelerate to practically its operating speed before any load is placed thereon. Therefore, the motor is developing almost full power when it assumes the load of the driven element 2.

Referring now to Fig. 4 there is shown a modification of the mechanism just described in which parts having the same function bear the same reference numerals as applied to Fig. 2. In the modified form of device, each lever 16' has associated therewith an arm 26 pivoted at 27 on a lug 28 carried by the flange 12'a. The other end of the arm 26 is pivotally connected to a ring 29 slidable on the sleeve 6'. The sleeve 6' has one or more weighted levers 30 pivotally mounted at 31 on lugs 32 to turn with the sleeve, each lever 30 providing a weighted portion 33 which normally tends to assume the full line position of Fig. 4 when the shaft 1' is stationary. However, when the shaft 1' starts to rotate, centrifugal force tends to turn each lever 30 about its pivot 31 to bring a portion 34 eccentric to the pivot 31 into engagement with an axially movable pressure ring 35, as shown in dotted lines, thereby exerting a camming action which tends to shift both the pressure ring 35 and lever ring 29 in the direction of the pressure plate 11'. When this occurs, each arm 26 bears on a pin 36 carried by a lever 16', thereby exerting a thrust on a plunger 14' to cause frictional engagement of the plates 9' and 10' with the flanges 7' and 8', which finally causes the rotation of the drum 2'a with the shaft 1', with the results described above.

From the foregoing then, it is apparent that by my invention I have provided an improved power coupling and cut-off that automaticaly establishes a driving connection between the driving element and the driven element as soon as the driving element accelerates to a speed at which it is best adapted to pick up the load connected to the driven element, and then to automatically disconnect the elements as soon as the driver comes to rest.

I claim:

1. In a device of the class described, the combination with a rotating driving element, a rotatable driven element connected to a load, clutch members interposed between said elements and plungers adapted to cause frictional engagement between said clutch members, of means dependent upon the speed of said driving element as it accelerates to its operating speed for causing said plungers to effect an initial engagement between said clutch members to rotate said driven element and further means dependent upon the speed of said driven member to cause said plungers to increase the degree of engagement of said clutch members and automatically bring said driven element up to the speed of the driving element.

2. In a device of the class described, the combination with a rotating driving element, a rotatable driven element connected to a load, friction clutch members interposed between said elements and plungers adapted to cause frictional engagement between said clutch members, of means responsive to centrifugal force developed by the rotation of said driving element for causing said plungers to press said frictional members in engagement as the driving element accelerates and further means dependent upon the centrifugal force developed by rotation of said driven element for additionally moving said plungers to increase the frictional engagement between said clutch members to automatically bring the speed of the driven element up to the speed of said driving element.

3. In a device of the class described, the combination with a rotating driving element providing a circular flange, a rotatable driven element providing a sleeve surrounding said flange, frictional members interposed between said flange and an opposed portion of said sleeve and plungers movable parallel to the common axis of said driving and driven elements engageable with said frictional members, of weighted levers pivotally mounted on said driven element normally out of engagement with said plungers when said driven element is stationary and centrifugally actuated members carried by said driving element adapted to turn said levers into engagement with said plungers to cause an initial engagement between said frictional members when the driving element starts to rotate.

4. In a device of the class described, the combination with a rotating driving element providing a circular flange, a rotatable driven element providing a sleeve surrounding said flange, frictional members interposed between said flange and an opposed portion of said sleeve and plungers movable parallel to the common axis of said driving and driven elements engageable with said frictional members, of weighted levers pivotally mounted on said driven element normally out of engagement with said plungers when said driven element is stationary and centrifugally actuated members carried by said driving element adapted to turn said levers into engagement with said plungers to cause an initial engagement between said frictional members when the driving element starts to rotate, rotation of said driven element causing said levers to turn under the influence of centrifugal force to further move said plungers and cause the transmission of full power between said elements.

5. In a device of the class described, the combination with a rotating driving element carrying relatively movable portions having oppositely beveled surfaces, a rotatable driven element, frictional clutch members interposed between opposed portions of said elements and weighted levers pivotally mounted on said driven element, of a series of balls confined between said oppositely beveled surfaces on said driving element, the portion having one of said surfaces being shiftable axially of said element in response to outward movement of said balls under the influence of centrifugal force when the driving element starts to rotate to cause an initial engagement between said frictional members and the resulting rotation of said driven element causing said levers to further turn under the influence of centrifugal force to additionally compress said frictional members and cause the transmission of full power between said elements.

LUKE LEWIS NAKASHIAN.